United States Patent
Coffey et al.

(10) Patent No.: US 10,058,209 B2
(45) Date of Patent: Aug. 28, 2018

(54) HIGH EFFICIENCY SELF-HEATING CONTAINERS

(71) Applicant: HeatGenie, Inc., Austin, TX (US)

(72) Inventors: Brendan Coffey, Austin, TX (US); Michael DeRossi, Lindenhurst, IL (US); Krzysztof C Kwiatkowski, Austin, TX (US); Brent C Ford, Kyle, TX (US)

(73) Assignee: HeatGenie, Inc., Austin, TX (US)

( * ) Notice: Subject to any disclaimer, the term of this patent is extended or adjusted under 35 U.S.C. 154(b) by 0 days.

(21) Appl. No.: 15/791,122

(22) Filed: Oct. 23, 2017

(65) Prior Publication Data

US 2018/0116448 A1    May 3, 2018

Related U.S. Application Data

(60) Provisional application No. 62/413,481, filed on Oct. 27, 2016.

(51) Int. Cl.
| | |
|---|---|
| *A47J 36/06* | (2006.01) |
| *A47J 36/24* | (2006.01) |
| *A47J 36/28* | (2006.01) |
| *F24V 30/00* | (2018.01) |

(52) U.S. Cl.
CPC ............. *A47J 36/245* (2013.01); *A47J 36/06* (2013.01); *A47J 36/28* (2013.01); *F24V 30/00* (2018.05)

(58) Field of Classification Search
CPC . A47J 36/245; A47J 36/06; A47J 36/28; F24J 1/00; F24V 30/00
See application file for complete search history.

(56) References Cited

U.S. PATENT DOCUMENTS

| | | | |
|---|---|---|---|
| 2006/0162344 A1 | 7/2006 | Scudder et al. | |
| 2007/0131219 A1 | 6/2007 | Ford et al. | |
| 2007/0204851 A1* | 9/2007 | Justo | B65D 81/3255 126/262 |
| 2010/0252023 A1 | 10/2010 | Coffey et al. | |
| 2012/0193367 A1* | 8/2012 | Baker | F24V 30/00 220/592.22 |

FOREIGN PATENT DOCUMENTS

| | | |
|---|---|---|
| EP | 0244837 A1 | 11/1987 |
| WO | 02085748 A1 | 10/2002 |

OTHER PUBLICATIONS

International Search Report and Written Opinion issued in corresponding international application No. PCT/US2017/058133, (dated Jan. 23, 2018).

* cited by examiner

*Primary Examiner* — Alfred Basichas
(74) *Attorney, Agent, or Firm* — DuBois, Bryant & Campbell, LLP; William D. Wiese

(57) ABSTRACT

A simple integrated assemblage of components built around a modular solid state heater, and incorporating an intuitive consumer user interface (CUI), enables self-heating functionality to be applied in standard beverage cans. The CUI includes an actuation mechanism for user initiation of heating, as well as a novel means of breaching the can to access the heated beverage.

6 Claims, 15 Drawing Sheets

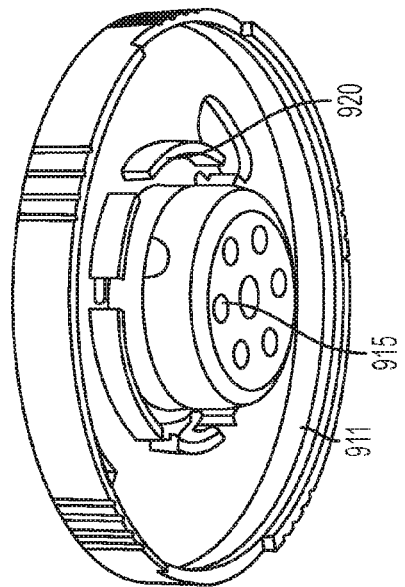
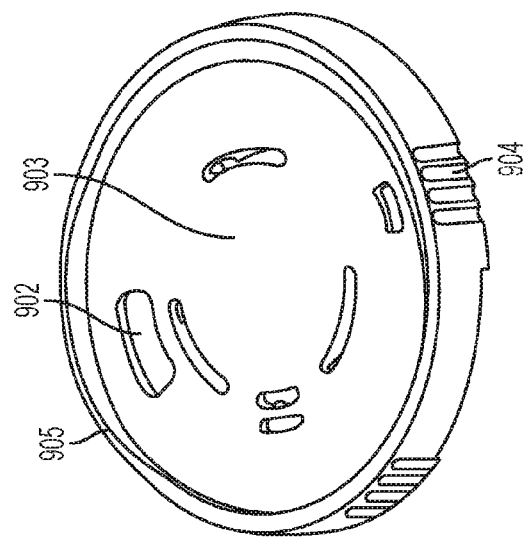
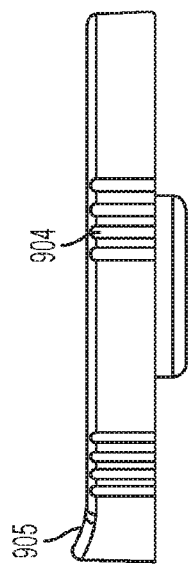
FIG. 9B
FIG. 9C
FIG. 9A

HIGH EFFICIENCY SELF-HEATING CONTAINERS

PRIORITY STATEMENT UNDER 35 U.S.C. § 119 & 37 C.F.R. § 1.78

This non-provisional application claims priority based upon prior U.S. Provisional Patent Application Ser. No. 62/413,481 filed Oct. 27, 2016, in the name of Brendan Coffey, Krzysztof C. Kwiatkowski, and Brent C. Ford entitled "HIGH EFFICIENCY SELF-HEATING CONTAINERS," the disclosures of which are incorporated herein in their entirety by reference as if fully set forth herein.

BACKGROUND OF THE INVENTION

Modular heaters that assemble into the base of containers to heat food and beverage contents contained therein to serving temperature are known in the art. For example, issued patents and pending patent applications describe a compact modular heating element that inserts into the base of a beverage can or other container with technology related to the present invention, including: U.S. Pat. No. 8,864,924 titled "Solid-State Thermite Composition Based Heating Device;" U.S. Pat. No. 9,055,841 titled "Package Heating Apparatus;" U.S. Pat. No. 8,555,870 titled "Package Heating Device and Chemical Compositions for Use Therewith;" U.S. Pat. No. 9,500,389 titled "Thermally Regulated Self-Heating Containers;" and U.S. patent application Ser. No. 12/570,822 titled "Package Heating Apparatus and Chemical Composition," all of which share at least one inventor in common with the present application.

These heater elements efficiently store chemical energy in contained solid state chemical reactants and are simply activated by a user to promptly release thermal energy. The thermal energy is transmitted through the wall of an immediately adjacent container to uniformly heat the interior contents. The features and functionality of the heaters described in the foregoing patents and applications are incorporated herein.

A compact modular solid state heater can be the engine of fast, efficient package heating. For facile commercial adaption, this component is best integrated into an end to end product solution that can readily be delivered to consumers. As the end-user of the product, consumer requirements may include: ease of use, reliability, safety, and cost. These and other essential functionalities should be embedded in the heated package, and the consumer user interface (CUI) so as to create a positive user experience.

Intermediate stakeholders in the complete end to end self-heating package solution include the brand companies identified on the containers to distinguish and market the product that incorporate the technology into their product portfolio, as well as the fillers and co-packers who must process and assemble the packaged product. Brands, in addition to satisfying their consumers' needs are also concerned with flexibility and ease of implementing the technology. For example: can the technology be applied to multiple package sizes and shapes, is it customizable for specific heating regimens (portion type and size, end temperature, speed of heating), etc.? In order to enhance their image with consumers, they also seek product implementations that enable differentiation and compelling branding.

With respect to commercial implementation, brands, fillers, and co-packers desire a compatibly engineered manufacturing solution with minimal disruptive impact on their existing supply chain operations. Given that, for a commercial product, the complete self-heating package comprises additional components relative to non-self-heating forms, some practical means must be provided for installation of the heater and any ancillary components. And those means must work within the general framework of how things are done in conventional filling and packaging operations. An end to end self-heating package product solution that incorporates an understanding of the requirements for package filling and assembly operations will streamline manufacturing while reducing capital needs and production cost.

There is a need, therefore, for a comprehensive end to end self-heating package solution that addresses the needs of fillers, brands, and consumers. The solution must provide product functionality to maximize the consumer experience while minimizing disruptive features and processes to maximize performance and efficiency in commercial implementation. The consolidated elements of the product solution must be integrated with conventional packaging technology to be experienced by a consumer via a novel, intuitive CUI.

SUMMARY OF THE INVENTION

Embodiments of the present invention incorporate a set of components built around a modular solid state heater to enable self-heating functionality to be applied in standard beverage cans processed and assembled on conventional filling lines. This new format for a self-heating beverage package provides a comprehensive end to end self-heating package solution addressing the needs of fillers, brands, and consumers for more immediate and universal applicability.

More specifically, a cylindrical modular solid state heater is integrated into a beverage end panel that also includes special breachable seals. The end panel is seamed onto a filled conventional 2-piece beverage can to provide a hermetic seal. A consumer user interface (CUI) in the form of a specially designed plastic lid apparatus snaps over the edge of the can. The CUI has molded in cam structures that, when the cap is rotated by a user, sequentially engage the heater and then the breachable seals to initiate the heater and open the heated beverage package.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 9A is a upper perspective view of one embodiment of a CUI for actuation of a self-heating package;

FIG. 9B is a lower perspective view of the same embodiment of a CUI for actuation of a self-heating package;

FIG. 9C is a side view of the same embodiment of a CUI for actuation of a self-heating package;

DETAILED DESCRIPTION

Figure 1:
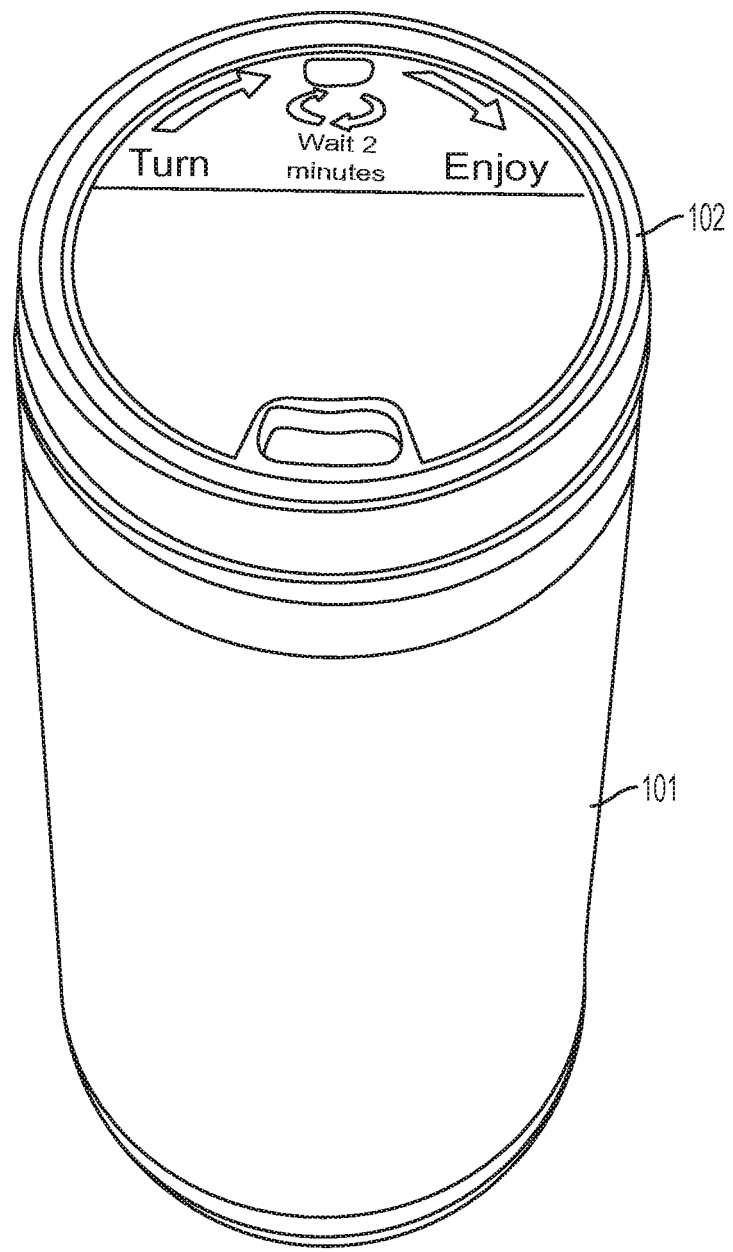
FIG. 1 is an exterior view of a one embodiment of a complete self-heating beverage package with a lid-mounted CUI.

The present invention is directed to an apparatus and method for providing an efficient self-heating package with an improved CUI. The configuration and use of the presently preferred embodiments are discussed in detail below. It should be appreciated, however, that the present invention provides many applicable inventive concepts that can be embodied in a wide variety of contexts other than devices for heating food and beverages. Accordingly, the specific embodiments discussed are merely illustrative of specific ways to make and use the invention, and do not limit the scope of the invention.

In addition, the following terms shall have the associated meaning when used herein:

"consumer user interface" or "CUI" means the externally accessible structures and devices whereby a user may operate or engage with the self-heating package;

"container" means and includes any receptacle in which material may be held or carried, including without limitation a can, carton, bowl, jar or other receptacle; and "heater" means and includes any device in which reactants react to generate heat.

As will be apparent to those skilled in the art, many of the self-heating packaging components are depicted herein without each and every element required for full functionality, such as, for example, devices shown without detailing features for mechanical engagement. In each case the depiction is intended to show the functional aspects of the heater for a better understanding of the invention and should not necessarily be construed as including all of the elements of a fully operational device.

It should be noted that in the description and drawings, like or substantially similar elements may be labeled with the same reference numerals. However, sometimes these elements may be labeled with differing numbers, such as, for example, in cases where such labeling facilitates a clearer description. Additionally, the drawings set forth herein are not necessarily drawn to scale, and in some instances proportions may have been exaggerated to more clearly depict certain features. Such labeling and drawing practices do not necessarily implicate an underlying substantive purpose. The present specification is intended to be taken as a whole and interpreted in accordance with the principles of the present invention as taught herein and understood to one of ordinary skill in the art.

Figure 2:
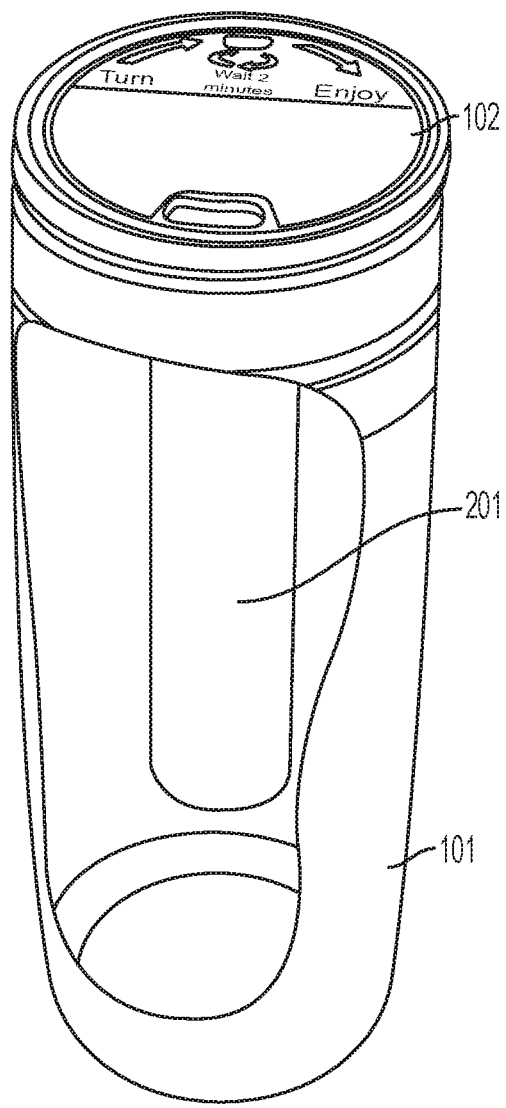
FIG. 2 is a partial cutaway view of the package shown in FIG. 1 illustrating that the external lid-mounted CUI is coupled to an internal heating structure.

FIG. 1 and FIG. 2 show one embodiment of the present invention wherein self-heating functionality is incorporated into a two-piece aluminum can, the most widely used metal package format for beverage applications. The designation "two-piece" refers to the two metal components: (1) a thin-walled cylindrical can body 101 which, as shown in FIGS. 1 and 2, may be decorated by a painted or applied label and (2) a seamable end, often with an easy-opening pull tab; the two pieces being joined by seaming into a hermetically sealed package. The seamable end is not visible in FIGS. 1 and 2, as it beneath and covered by a shaped plastic cap that constitutes the CUI 102, as shall be further described. The exterior wall of an internal heating element structure 201 seen in the cutaway view of FIG. 2 is mounted to the underside of the seamable lid. The heater is thus in proximity to the CUI 102 via which it is operated.

Metal beverage cans are produced in a wide variety of sizes and shapes, for which it would be challenging to customize a universal heating solution. However, while can body diameters and heights vary greatly, the seamable open neck of most can bodies are often formed to be compatible with one of a small number of the most commonly used standard seamable end sizes. Thus, it is a particular advantage that embodiments of the present invention can be integrated into standard-sized seamable end closures and thus be readily applied in the widely used two-piece can format. The heater output is readily scaled to different can sizes and temperature rise targets by changing the length, diameter, or contents of the heater body components, for universal applicability. Alternative embodiments of the present invention may be applied in three-piece can formats.

Figure 3:
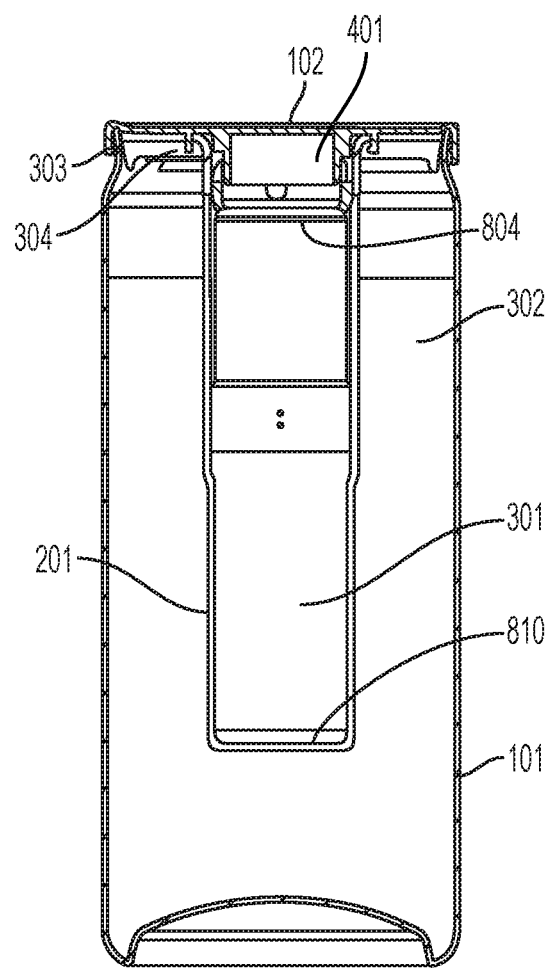
FIG. 3 is a diagrammatic cross-sectional view showing the internal components of a filled self-heating container with a lid-mounted CUI.

FIG. 3 shows a diagrammatic cross-sectional view of an embodiment of a self-heating two-piece can with a lid-mounted CUI 102 further illustrating the major functional elements of the device as they appear in relation to each other in a filled beverage can. As before the exterior envelope of the package is bounded by the can body 101 and the CUI 102. The can body is partially filled by a beverage to be heated 302, for example coffee. A cylindrical heater module 301 contained in a cylindrical well extending from the underside of the seamable lid 304 down along the centerline of the can body 101. By design, the thermal output of the activated heater module 301 is centered within the liquid to be heated 302 and furthest from the external surfaces of the body 101, 102 for high thermal efficiency.

Note that the heater module 301 itself is not in direct contact with the fluid to be heated 302 being fully enclosed within a cylindrical pocket 201 of a specially formed seamable closure. As with conventional can ends, the seamable closure of the present invention provides a continuous boundary completely sealing the interior contents of the can away from the external environment, all around the perimeter of the seamed joint 303 between the end and the can body 101. However, unlike the generally flat structure of a conventional closure, the metal-walled envelope of the present closure encompasses a deep drawn cavity 201 for housing the heater module 301.

Figure 4:
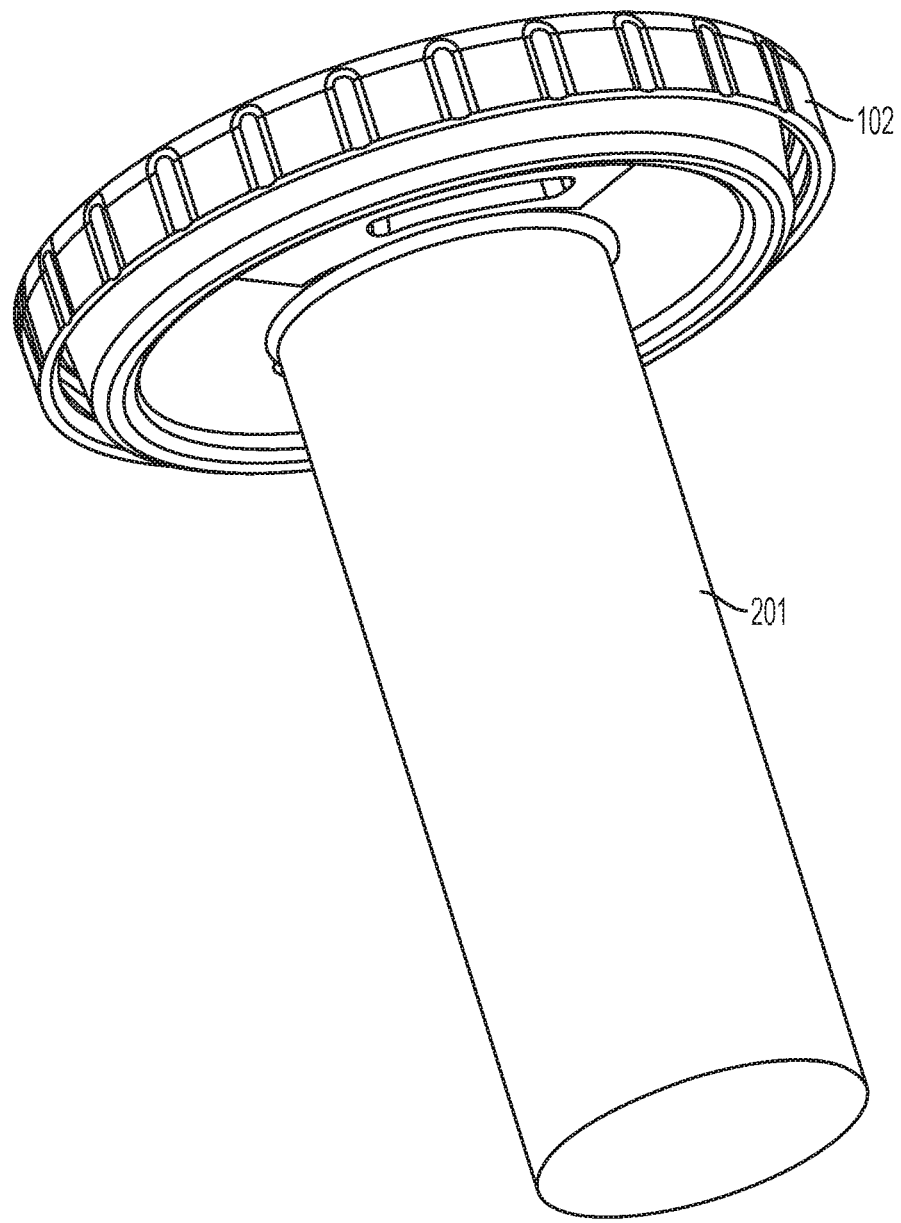
FIG. 4 is view of a composite assembly as may be suitably joined with a conventional can body to incorporate all of the heating and CUI functionality.

FIG. 4 show a three-dimensional view of the exterior of a composite assembly that encompasses all of the self-heating and CUI components and functionalities described herein. Viewed in this way, FIG. 4. represents a fully engineered, complete, and self-compatible solution. Effectively a beverage brand wanting to implement CUI controlled self-heating into a standard beverage can would replace their standard end-closure with the assembly of FIG. 4. This assembly usefully encapsulates the add-on componentry and costs for self-heating and delineates where brands can otherwise use standard supply chain components (for example cans) and processing operations (for example filling and seaming). Thus, a beverage brand already in market with a non-self-heating product does not require a customized can and is able to make use of their existing package format and filling line.

Figure 5:
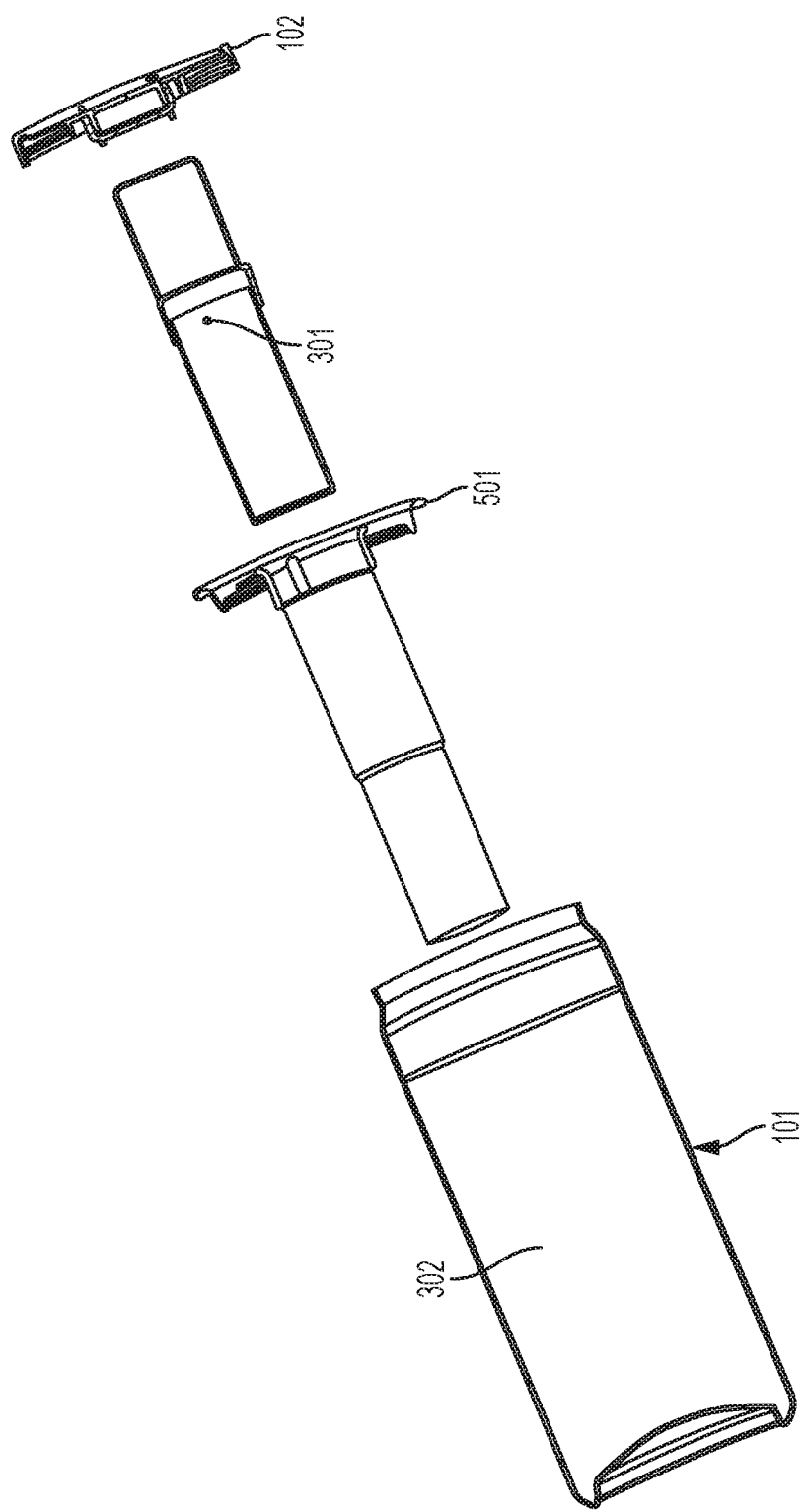
FIG. 5 shows an exploded view of the assembly of FIG. 4 broken into three major sub-assembly components.

FIG. 5 shows an exploded view of the assembly of FIG. 4 broken into its three major sub-assembly components: the seamable end with heater cavity 501, the heater assembly 301, and the CUI 102 in relation to a conventional can body 101 onto which they may be assembled. Each of the component sub-assemblies will now be further described.

Figure 6:
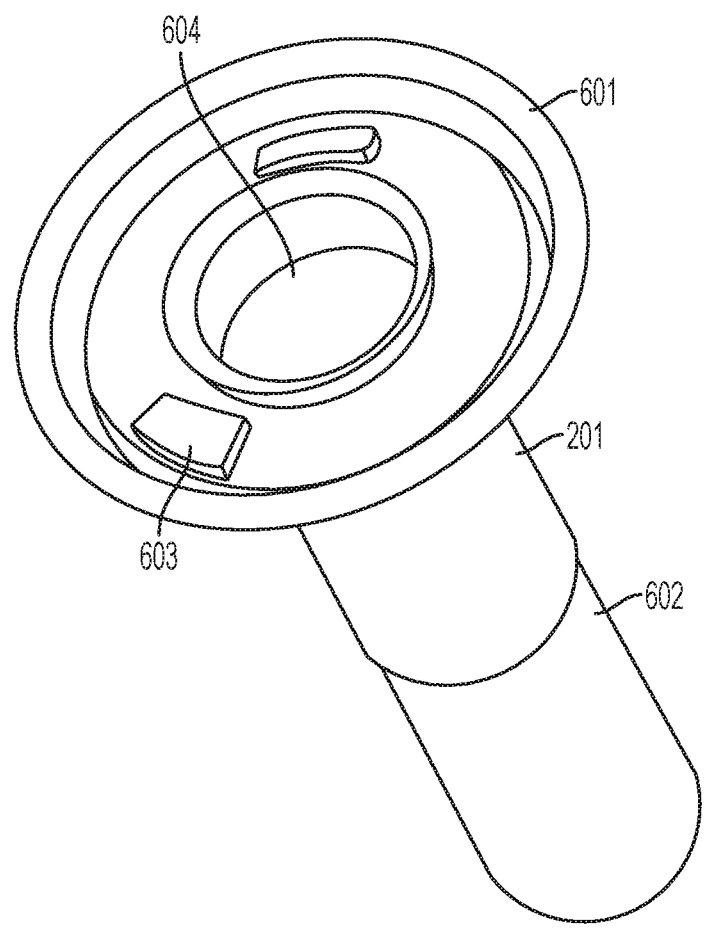
FIG. 6 is a view of one embodiment of a seamable end suitable for attachment to a conventional can body, and able to accommodate the heater and CUI components.

FIG. 6 shows a 3-dimensional view of an embodiment of an aluminum seamable end with a heater cavity suitable for attachment to a conventional can body. The seamable closure serves multiple essential functions in the present invention including: hermetically sealing the container, housing the heater, and engaging with the heater and CUI components. The heater cavity of the seamable end may be produced from a food grade compatible aluminum alloy in a deep draw transfer press. The thin metal wall of the deep drawn cylinder beneficially provides surface area for efficient heat transfer.

When applied as the lid of a 2-piece can, the seamable end must also incorporate some physical means of opening the can to access the heated beverage contents, since the central deep drawn cavity generally precludes a conventional pull tab easy opening structure. Appropriate means for breaching the end closure will be described when discussing the function of the CUI. Other specific features, for example a retaining groove, 604, or breachable seal 603 may be formed into the seamable metal end as needed for securely latching or otherwise engaging the heater module or CUI, as will be described when discussing those components.

Referring to FIG. 6, the seamable end has a formed edge curl 601 around its perimeter. As understood to those in the art, the interior underside of the curl is lined with a sealant material, the form of the curl and the sealant designed to be mating surfaces for seaming onto the body hook feature around the open neck of an unseamed can body. In accordance with industry practice, all interior can metal surfaces, including the wall of deep drawn cavity 201 are coated with a thin layer of a polymer lacquer to prevent corrosion and contamination of contents.

Figure 7D:
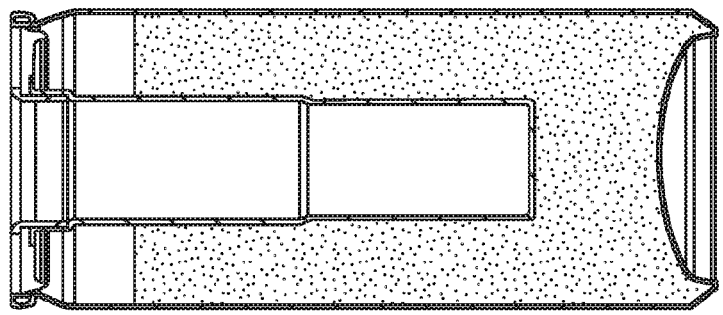
FIG. 7A through 7D is a diagrammatic illustration of an assembly sequence whereby the seamable end of FIG. 6 is fully incorporated onto a filled can body.
Figure 7C:
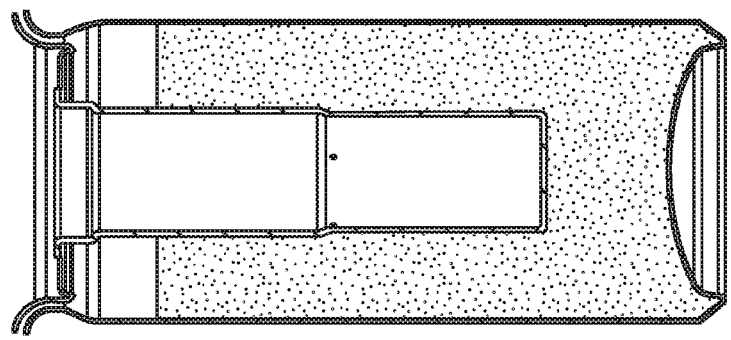
Figure 7B:
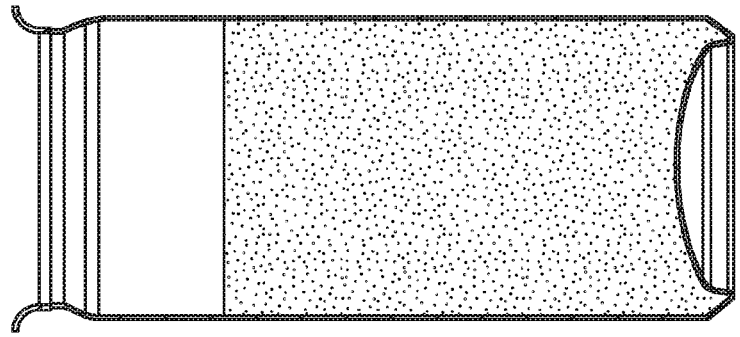
Figure 7A:
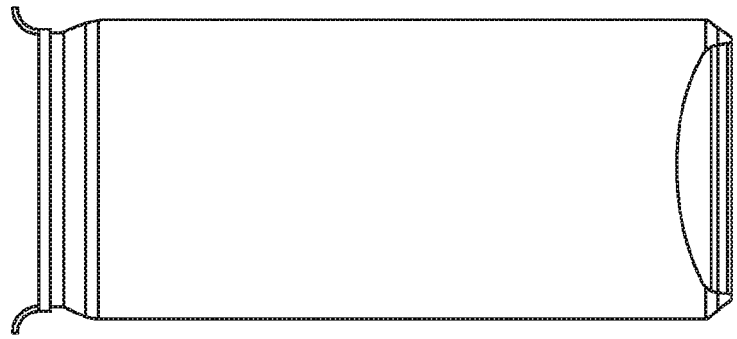

FIGS. 7A through 7D illustrate an assembly sequence as would be carried out on an automated beverage filling line whereby the seamable end of FIG. 6 is incorporated onto a filled can body. FIG. 7A shows a clean and empty can body as it enters the line. FIG. 7B shows the can body now partially filled. Note that the fill level must be reduced somewhat relative to an unheated beverage can to accommodate the heater volume displacement. The slender form of cylindrical heater of some embodiments of the present invention allows a volume reduction of just 10-15% in a standard can body. FIG. 7C shows the unseamed lid being positioned down onto the body hook of the can. A mechanism for synchronous lowering of the lid as the filled cans move forward on the filling line can accommodate the extended length (relative to a standard easy open end) of the heater cavity without reducing filling line throughput. Once the seamable end is positioned on the can body, the standard seaming operation may be applied, resulting in the completed assembly shown in FIG. 7D. After seaming the heatable can is hermetically sealed and can be handled or post-processed in the standard way for non-heated cans.

Figure 8:
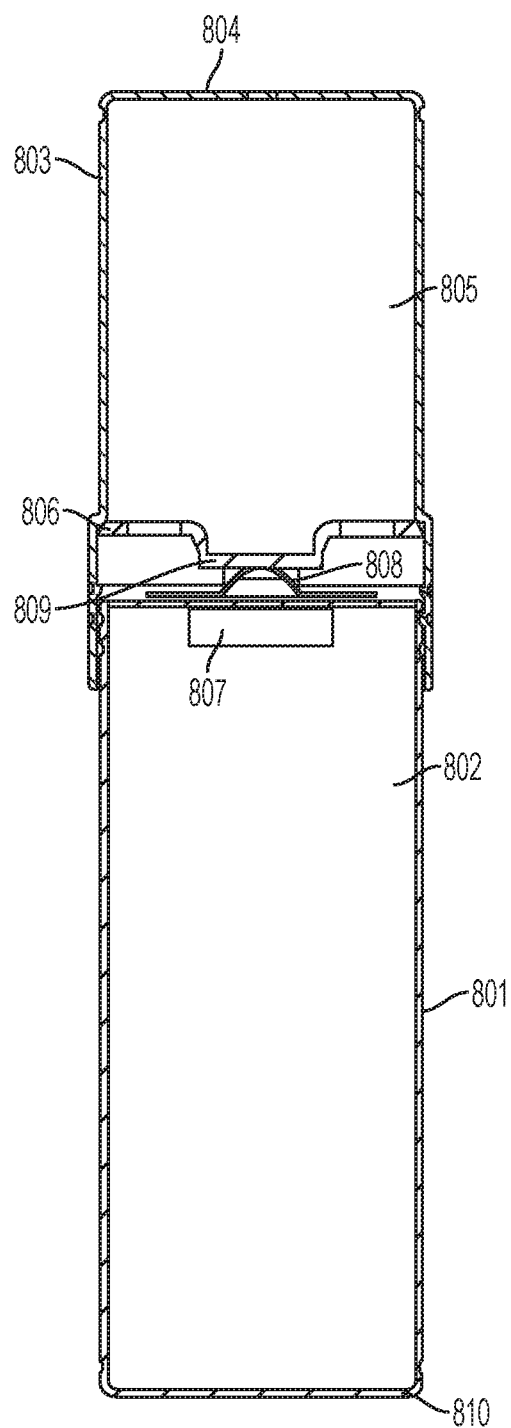
FIG. 8 is a cross sectional view of one embodiment of a modular solid state heater.

FIG. 8 is a cross sectional view of an example modular solid state heater assembly. A metal walled canister 801 is filled with a solid-state reaction mixture 802. Various solid-state reaction chemistries may be used to provide a compact, lightweight, powerful heat source. The energy content and the heating rate are configurable via adjustments to the mass or composition of the internal fuel mix for use with different portion types or sizes. Although other formulations could be used, an example heat-generating formulation is a mixture containing 15-25% aluminum, with particle size of 2-30 microns, 20-30% silicon dioxide, 25-45% alumina, and additives and reaction aids such as potassium chlorate, calcium fluoride, and barium peroxide.

To initiate the thermal reaction inside the heater, the reactant mixture 802 may be ignited near its upper surface by various means known in the art such as, for example, expelling a reactive "starting fluid" from a blister onto a reactive starting pellet in response to a force applied by the user via the CUI.

Referring again to FIG. 8, an upper metal walled canister 803 is positioned over the lower canister 801 containing the fuel mix 802. The two canisters are loosely coupled such that they may slide relative to each other in response to a force applied between the upper 804 and lower 810 ends of the assembly. As shown in FIG. 3, when the heater module 301 is installed in a heated package, the lower canister surface 810 is immediately adjacent to the bottom of the seamable closure heater cavity and the upper canister surface 804 is adjacent to an actuation mechanism 401 on the underside of the CUI 102.

Referring again to FIG. 8, a reactive starting pellet 807 is embedded into the upper surface of the compacted fuel-oxidizer mix 802 and a starting fluid filled blister 808 is positioned above this starting pellet 807. In a pre-actuation rest position, a raised pip 809 at the center of an interior end plate 806 of the upper canister is held a small distance away from the upper surface of the compressible fluid filled blister 808. When a user causes the upper canister 803 and lower canister 801 to be pressed a defined distance closer together, the raised pip 809 directs a crushing force to expel the fluid contents of the blister 808 onto the starting pellet 807 thereby initiating a heating reaction.

It is desirable to provide a responsive means of moderating the heating process to prevent overheating of the package assembly or the food or beverage products and protect users against burns. Methods of accomplishing passive thermal control previously described in U.S. Pat. No. 9,500,389 titled "Thermally Regulated Self-Heating Containers," may equivalently be applied to the heater assembly described herein, by arranging for a passive thermal control material to be adjacent to and in thermal contact with the heater module reaction chamber.

Referring once again to the embodiment of FIG. 8, some portion of the interior volume 805 of the upper canister 803 can be filled with passive thermal control materials. The closely coupled metal walls of the upper canister 803 and the lower canister 801 provide good thermal contact and enable heat transmission between them. In the event of internal overheating, dissipating steam generated from the passive thermal control material away from the heated package removes significant energy from the system to produce a cooling effect.

The heater assembly construction should therefore provide for steam vapor or other interior gasses to be emitted gas streams. Referring back to FIG. 8, the end wall 804 and the interior end plate 806 of the upper canister 803 may both contain channels or vents to allow safe and gentle release of excess pressure when passive thermal control is activated. Venting channels may also be present in the CUI. In addition to passive thermal control materials, the upper canister may contain other insulating, odor absorbing materials (for example activated carbon), particle filtration layer(s) (for example fiberglass or ceramic mat), or thermal diluent materials. Emergent gasses may be filtered through a porous insulator to remove particulates.

FIG. 9A shows an upper view of one embodiment of a consumer user interface (CUI) for actuation of a self-heating package, FIG. 9B shows the underside of the same CUI, and FIG. 9C shows a side view of the same CUI. One principal function of the CUI is to provide a means for a user to initiate the heater. In a two-piece can embodiment in which the heater occupies the central portion of can end, a lid-mounted CUI can be configured to open the can to access the heated beverage through a pour aperture 902 in its surface. The CUI component may also serve several addition functions described herein.

The CUI takes the form of specially designed plastic lid apparatus that snaps over the edge of the can, with multiple structural features molded into its upper, lower, and side walls to achieve various functions. The CUI may be injection molded from polypropylene or other food grade polymer, which beneficially provides thermal insulation between the heated metal can surface and the consumer of the heated beverage contents. As shown in FIG. 9A on its outward facing upper surface, functional features can include a pour aperture 902 and pour spout 905 and flat central region 903 where marketing or instructional information may be displayed.

As shown in FIG. 9B, structural features that may be incorporated into the lower surface of the CUI may include: an undercut lip 911 for snapping onto the seamed edge bead around the top of the can, as well as flexible plastic fingers 920 for gripping onto the heater cavity in the lid. The lower surface may also include a plunger mechanism 915 for initiating the heater, as well as cams (not shown in this view) for opening the sealed can. As shown in FIG. 9C, the sidewalls of the CUI may incorporate knurling 904 to facilitate gripping and rotating the CUI, which action is used in various embodiments of the present invention to initiate the heater and open the can.

Figure 10B:
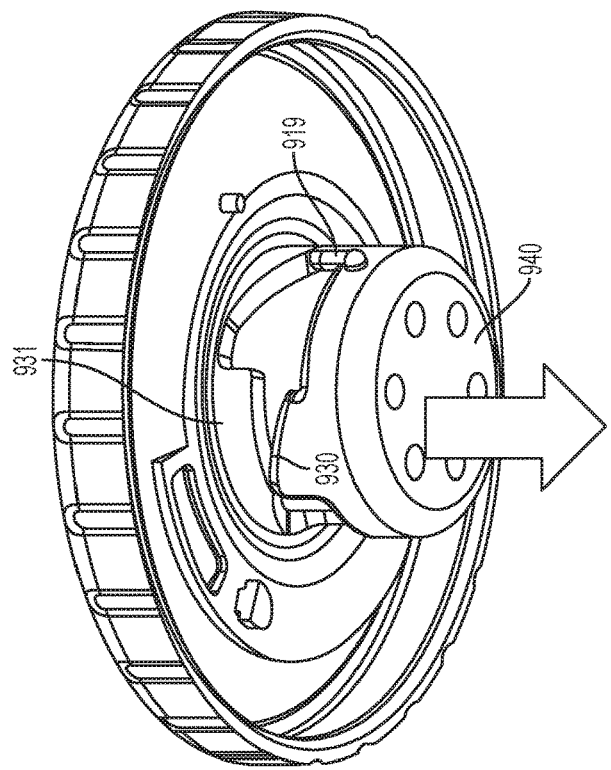
FIG. 10B is a depiction of one embodiment of the underside of a CUI for actuation of the heater in the actuation position.
Figure 10A:
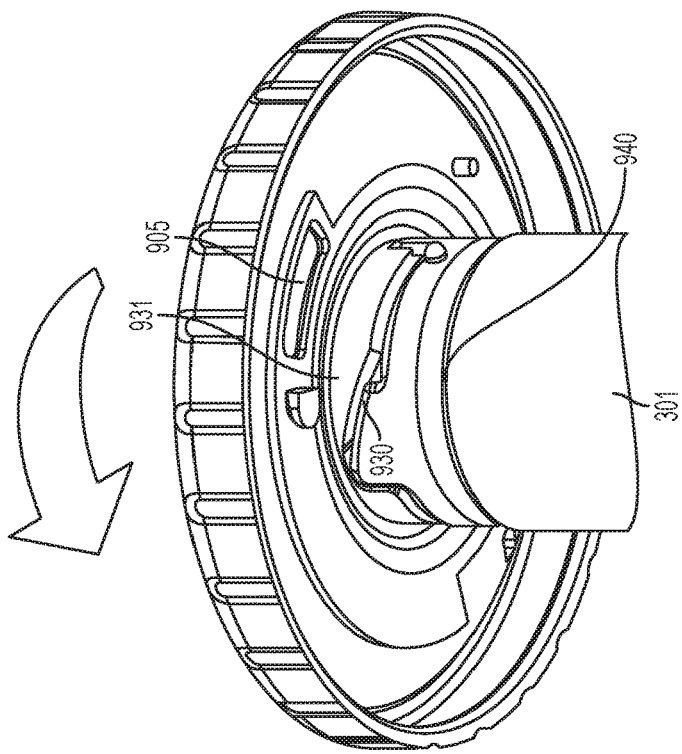
FIG. 10A is a depiction of one embodiment of the underside of a CUI for actuation of the heater in the initial rest position.

As previously described the heater is inert until actuated by a user applying a compressive force to the heater assembly. While the user force could be applied by directly pushing onto a flexing CUI, embodiments that use a rotating action of the CUI to drive a plunger mechanism offer a number of advantages. FIGS. 10A and 10B illustrate how rotation of the CUI may be coupled to a cam mechanism on the underside of the CUI to force a vertical displacement of a plunger to actuate compression of the heater. A cylindrically arranged cam ramp 931 formed into the underside of the CUI is opposite a cam ramp on a movable plunger 930. In the initial rest position shown in FIG. 10A, the plunger 930 is retracted with its lower surface 940 adjacent to the top of a heater assembly 301. Rotation of the plunger is prevented by lobes 919 around its sidewalls that engage with vertical channels in the wall of the heater cavity. Thus as shown in FIG. 10B, a partial clockwise rotation of the CUI causes cam ramp 931 to progressively force the plunger 930 down a fixed distance to compress and activate the heater assembly.

A cam mechanism may beneficially provide mechanical advantage to reduce the force the user must apply in comparison to a direct push. The cam motion can be designed to start the heater assembly with just a fractional rotation, for example 45 angular degrees of the plastic lid. For more intuitive ease of use, visual indicators of the degree of rotational movement may be incorporated into the CUI to provide user feedback of the state of initiation. Mechanical détentes may also be included in the CUI to allow only unidirectional rotation and provide tactile feedback as to when the appropriate range of motion for heater actuation or other actions have been completed. The indicators incorporated into the CUI can also be used for tamper evidencing, enabling a user to tell if the heater has been started and/or if the can has been opened.

Additional cam lobes may be arranged on the underside of the CUI, that in combination with certain breachable seals installed in the can end, enable a user to open the can and access the heated beverage contents by continuing the degree of rotation of the CUI beyond the position for heater actuation.

Figure 11:
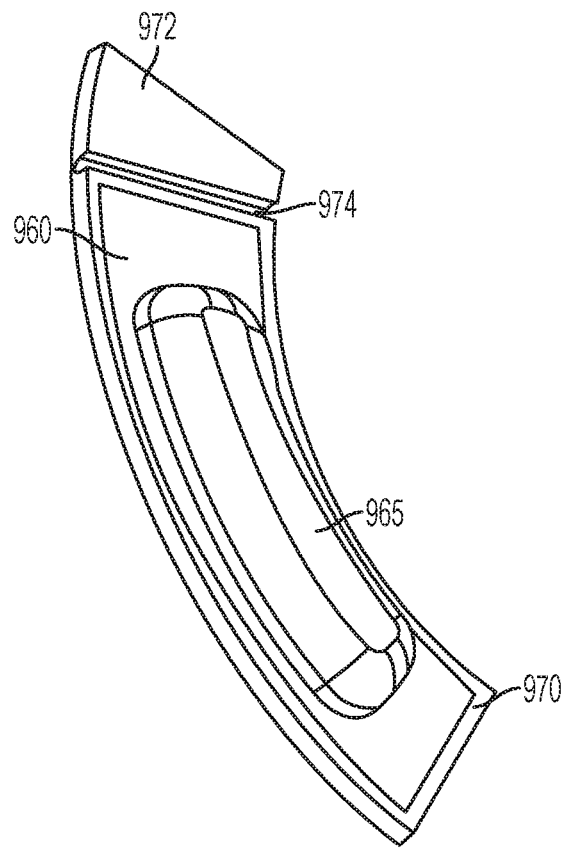
FIG. 11 shows one embodiment of a formed shutter that may be used in a breachable seal.

The breachable seal is comprised of a shaped aperture in the end wall of the closure that is resealed by bonding a formed shutter over the aperture to create a liquid tight seal between the can end and the shutter. FIG. 11 shows one embodiment of a formed shutter. The shutter may be formed from a rigid aluminum foil similar to that used in forming the can end, or molded from a food safe plastic. The shutter material may be coated with or laminated to a thermoplastic film to provide a heat activated adhesive seal.

The shape of the shutter generally follows that of the aperture, but with a larger footprint to provide a boundary region 970 all around its perimeter suitable for bonding to the interior end wall of the closure. The bounding perimeter of the shutter 960 is generally flat while the central portion 965 is raised such that it may protrude through the aperture. A living hinge structure 974 may be incorporated into an extension 972 of the shutter. This extension also bonded to the end surface will retain the shutter when the seal is breached.

Figure 12B:
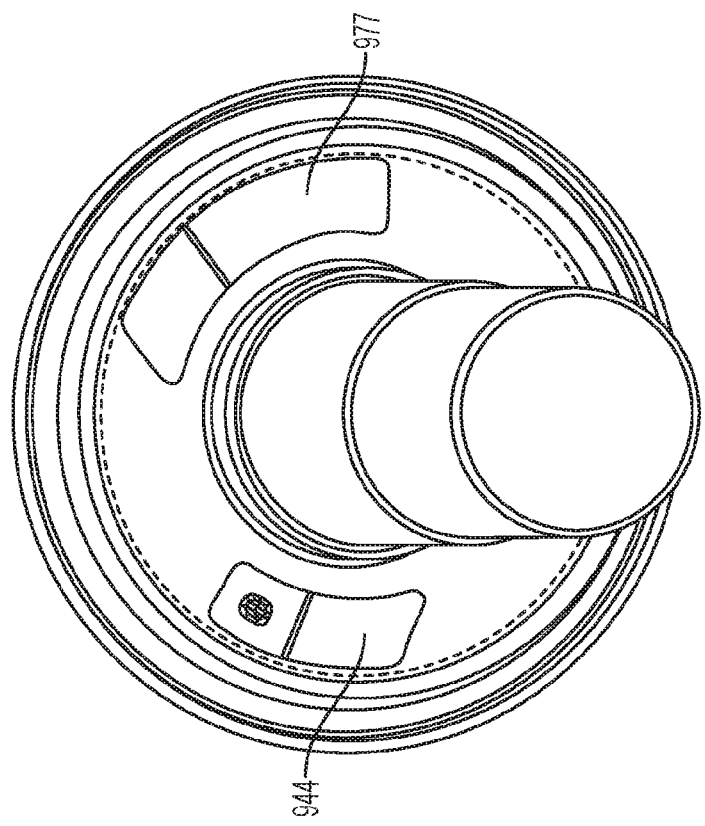
FIG. 12B shows a depiction of the lower view of one embodiment of the seamable end with a deep drawn heater cavity and breachable seals.
Figure 12A:
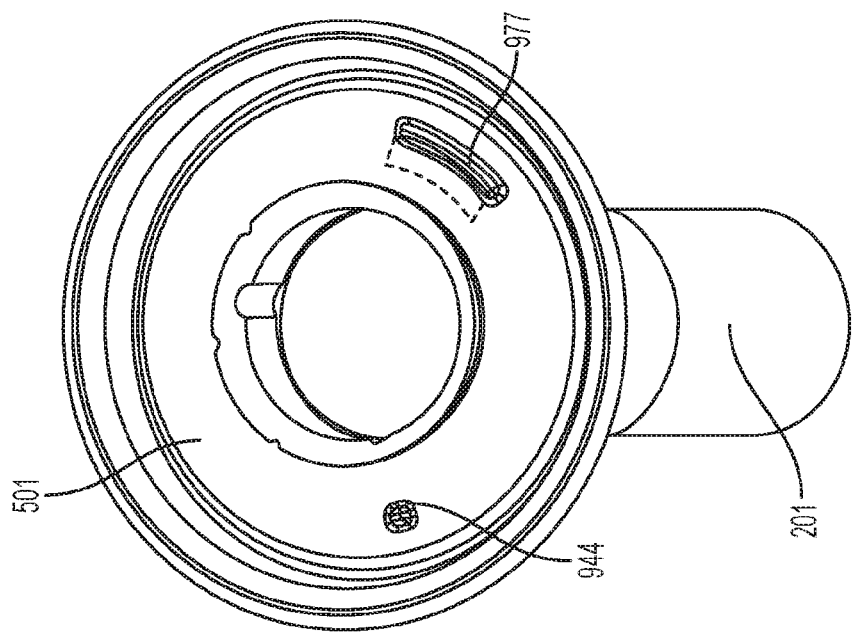
FIG. 12A shows a depiction of the upper view of one embodiment of the seamable end with a deep drawn heater cavity and breachable seals.

FIG. 12A shows an upper view of a seamable end 501 with a deep drawn heater cavity and two breachable seals, the larger seal 977 being the pour aperture and a smaller seal 944 providing a vent opening for air to aid in pouring of the beverage. FIG. 12B shows a lower view of the same seamable end.

Figure 13B:
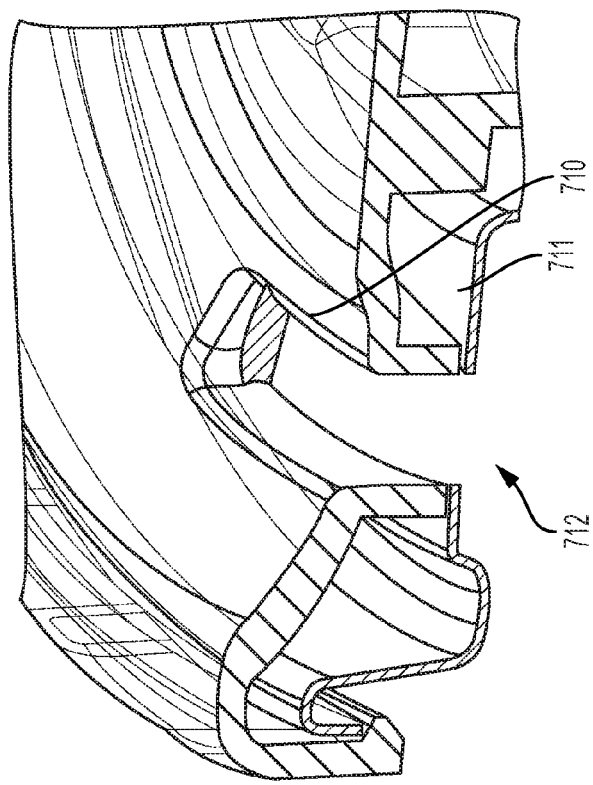
FIG. 13B illustrates the open position of the breached container.
Figure 13A:
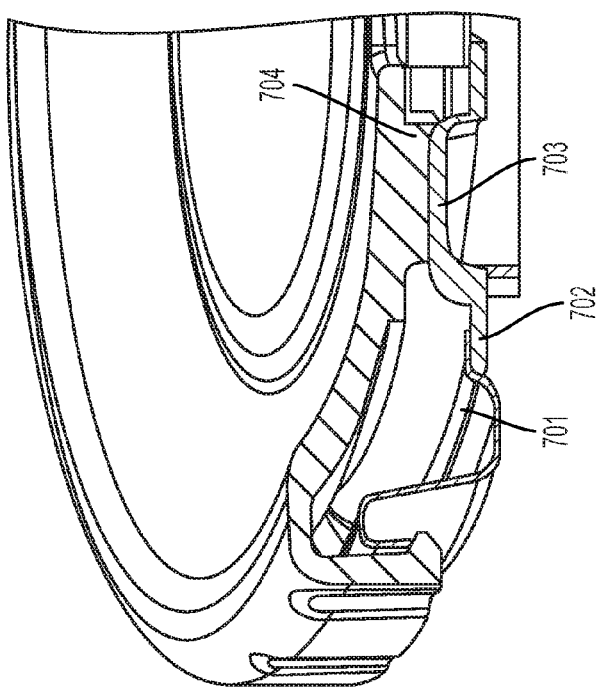
FIG. 13A illustrates the breaching of a seal by over-rotation of a cam lobe of the CUI.

FIG. 13A illustrates the breaching of a seal by over-rotation of a cam lobe of the CUI. As the lid 102 is rotated, the breaching cam 704 pushes against the raised portion of the rigid shutter 703. The applied force debonds the perimeter seal between the can end 701 and the planar bounding perimeter of the shutter 702, allowing the shutter to be separated from the metal lid.

FIG. 13B illustrates the open position of the breached container with the pour aperture 710 of the CUI lid bounded by an internally extending sidewall 712 is in alignment with the breached shutter opening in the can end 711.

Figure 14:
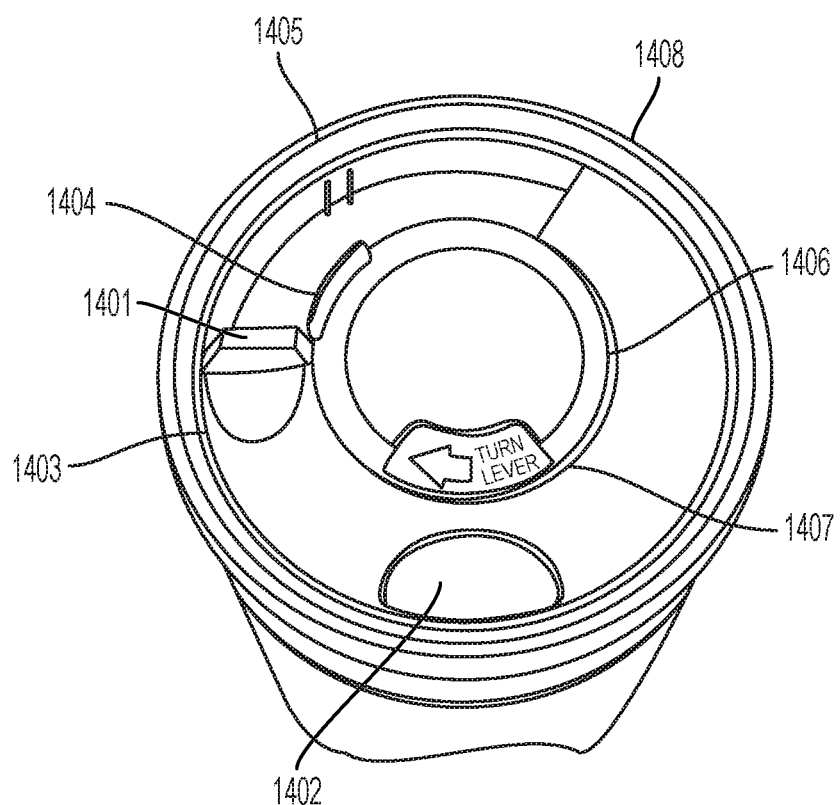
FIG. 14 illustrates features of an alternative embodiment of a CUI.

In alternative embodiments, the shutter may be comprised of a thinner, more flexible aluminum foil laminate planar structure stretched over and bonded around the aperture. In these embodiments, the breaching cam may either breach the seal by piercing the foil or pushing against it to debond it, thereby opening the container FIG. 14 shows an alternative embodiment of a CUI in which the heater operation and breaching functions are operated using an interior mounted lever structure 1401 rather than rotating the cap by its edge 1408. A rotating aperture cover 1402 is flush with the surface of the CUI, and may optionally be reclosed after opening. A removable security tab 1404 indicates whether the package has been initiated or opened. The lever may be engaged by a détente 1405 to provide visual and tactile indication of the heater initiation position. Additional indications and instructions may be provided by changing graphics in a user window.

Figure 15C:
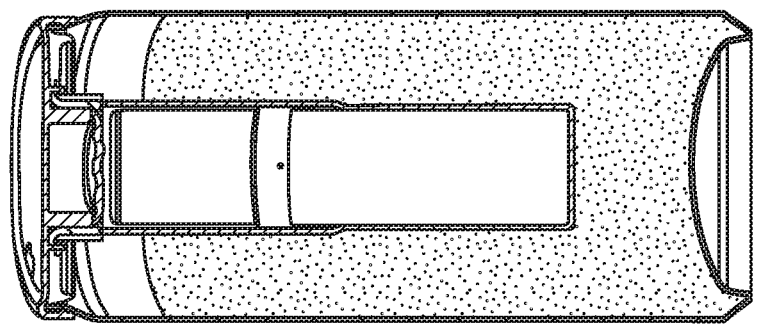
FIG. 15A through 15C is a diagrammatic illustration of an assembly sequence whereby the heater and CUI are installed onto a filled and processed beverage can.
Figure 15B:
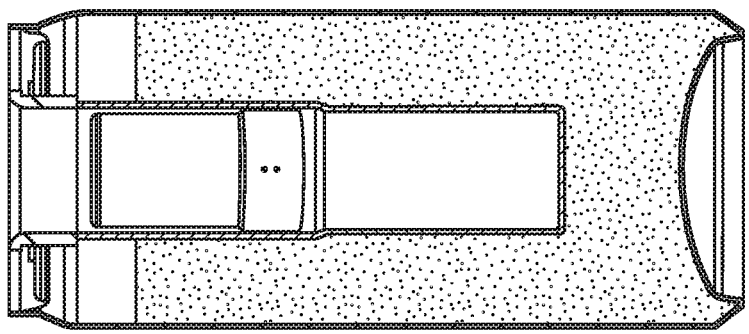
Figure 15A:
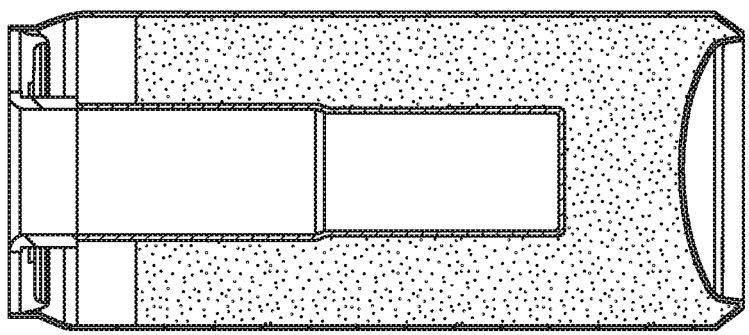

FIGS. 15A through 15C illustrate an assembly sequence whereby the heater and CUI are installed onto a filled beverage can. Relative to a conventional filling line, additional equipment is needed to complete this operation, however the consolidated, integrated device structure minimizes the number of components and assembly steps required. The heater assembly may be first followed by installation of the CUI, or they may be pre-assembled prior to installation and installed as a single unit. On filling lines, filling and seaming of beverage cans is often followed by thermal processing operations such as retort or pasteurization. The heater assembly and CUI can be installed pre- or post-thermal processing with suitable engineering accommodations.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

We claim:

1. A can end for a two-piece container, comprising:
   a seamable can end having an upper surface, a lower surface, and a formed edge curl around its perimeter;
   a breachable seal positioned over an aperture in the can end;
   a heater affixed to the lower surface of the can end;
   a consumer user interface includes a cam that sequentially engages the heater to initiate an exothermic reaction and also sequentially engages the breachable seal to create a passageway through the can end.

2. The can end for a two-piece container of claim 1, wherein the heater is cylindrical and the center line of the heater is affixed to the lower surface of the can end in the middle of the can end.

3. The can end for a two-piece container of claim 1, wherein the heater consists of a heater assembly inside a heater cavity.

4. The can end for a two-piece container of claim 1, wherein the can end is attached to a body of a container by seaming the formed edge curl to the body to form a hermetic seal.

5. The can end for a two-piece container of claim 1, wherein the breachable seal comprises a formed shutter that is removably sealed to the lower surface of the can end around the aperture's perimeter and, as the consumer user interface is rotated, a breaching cam pushes against a portion of the shutter thereby debonding the shutter from the lower surface.

6. The can end for a two-piece container of claim 1, wherein the breachable seal comprises a foil laminate that is removably sealed to the to the lower surface of the can end around the aperture's perimeter and, as the consumer user interface is rotated, the foil laminate is pierced.

* * * * *